United State

Mierzwinski

[11] 4,042,821

[45] Aug. 16, 1977

[54] REMOTE CONTROL LIGHT RECEIVER

[75] Inventor: Eugene P. Mierzwinski, Fort Wayne, Ind.

[73] Assignee: The Magnavox Company, Fort Wayne, Ind.

[21] Appl. No.: 626,165

[22] Filed: Oct. 28, 1975

[51] Int. Cl.² .................... H01J 3/14 ; G02B/3/06
[52] U.S. Cl. .................... 250/216; 250/239; 350/190
[58] Field of Search .............. 250/551, 552, 211 R, 250/211 J, 216, 239; 357/17, 18, 30; 350/190

[56] References Cited

U.S. PATENT DOCUMENTS

| 3,368,078 | 2/1968 | Flint et al. | 357/30 |
| 3,396,344 | 8/1968 | Broom | 357/18 |
| 3,562,527 | 2/1971 | Chaimowicz | 250/551 |
| 3,694,902 | 10/1972 | Apgar et al. | 357/17 |
| 3,697,762 | 10/1972 | Kurtz | 250/552 |
| 3,922,522 | 11/1975 | Anderson | 350/190 |

Primary Examiner—David C. Nelms
Attorney, Agent, or Firm—Thomas A. Briody; William J. Streeter; George R. Pettit

[57] ABSTRACT

A light receiver for use in a light activated remote control system. A modified cylindrical lens having a wide horizontal acceptance angle and a narrow vertical acceptance angle is directly coupled to a photodetector. The resulting combination provides optical gain with a minimum compromise in directivity.

12 Claims, 4 Drawing Figures

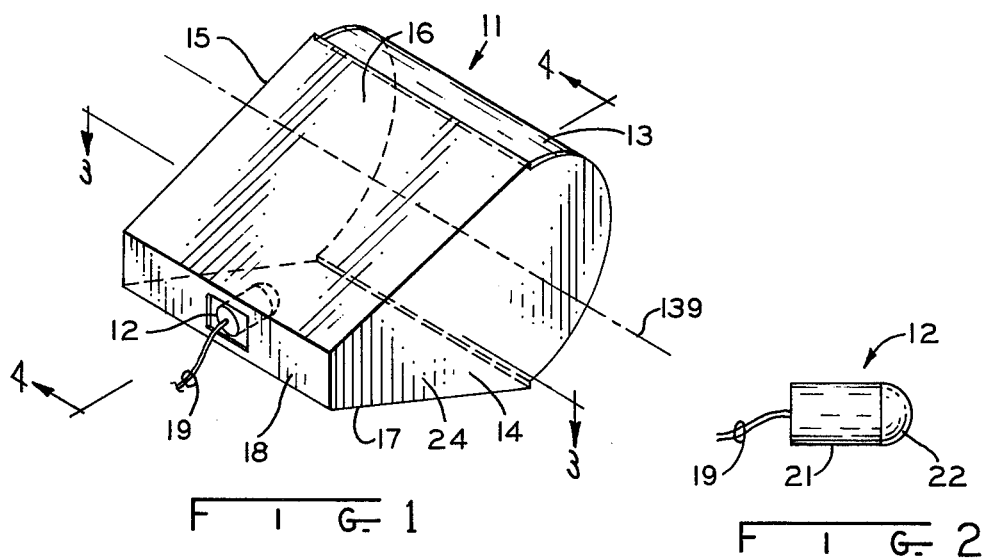
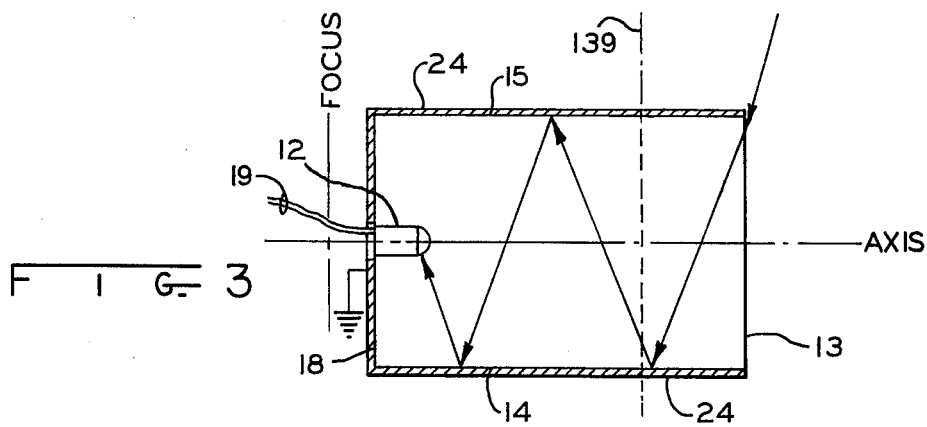
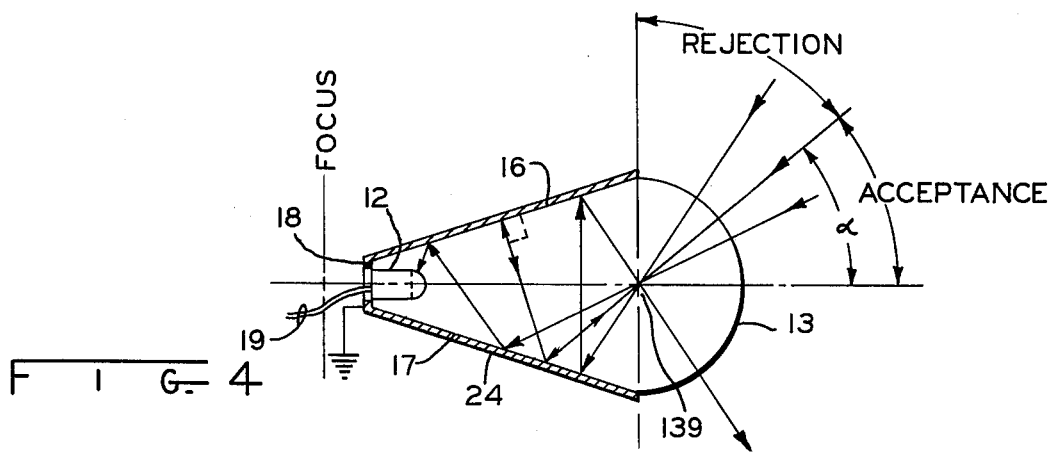

REMOTE CONTROL LIGHT RECEIVER

DESCRIPTION OF THE PRIOR ART

Remote control systems for operating a television receiver are well known in the art. The operator initiates a command from a hand held transmitter. The transmitted command is usually a burst of ultrasonic energy or light energy which is directed toward the television receiver. The television receiver is equipped with a receiver for capturing the transmitted ultrasonic or light energy. This receiver provides an electrical signal which is decoded into a command which additional circuitry executes.

In one type of system for remotely controlling a television, a single ultrasonic frequency corresponds to each remotely controlled function or command. The receiver detects the presence of this signal and executes the command. Ultrasonic transmitters are efficient and the signal path loss is low. The ultrasonic signals are strongly reflected by many room surfaces. Thus, ultrasonic systems are not particularly sensitive to transmitter orientation with respect to the receiver. Ultrasonic noise is present however in most home environments. The use of electric mixers, vacuum cleaners or the mere dropping of a set of keys will produce a burst of ultrasonic frequencies. Such noice may initiate a false command in a system where a single frequency is used to initiate a command. A single frequency command system also makes impractical a large number of function commands. Digital coding techniques in ultrasonic systems are not practical because of the reflections and propagation time of acoustic energy in an air medium.

Light activated remote control systems overcome some of the disadvantages of ultrasonic systems but have distinct disadvantages of their own, e.g., line of sight propagation and a substantial path loss. Because light energy has a lower propagation time than ultrasonic energy, more functions may be defined and controlled through the use of pulsed code modulation. A coding scheme also increases the noise immunity over a system which detects only the presence of a single frequency. Light energy, however, is subject to a much greater path loss than ultrasonic energy. Additionally, transducers which convert electrical signals into infrared light energy are not as efficient as their ultrasonic counterparts. To overcome the losses sustained by the infrared system, it has been necessary to introduce more directivity into the infrared remote control link than is found in the ultrasonic system. The operator must take care in aiming the transmitting source toward the light receiver. Since television styling restrictions limit the size of the light receiver aperture, the receiver gain is further limited, thus making aiming of the transmitter at the receiver more critical. The present invention reduces the directivity requirement of previous light activated remote control systems.

SUMMARY OF THE INVENTION

The light receiver of the present invention utilizes a modified cylindrical lens which may be formed from any of several materials that are optically transparent to light energy and have a suitable index of refraction. A light detector is directly bonded to the lens. The direct bonding of the detector to the lens eliminates losses that occur from having an air interface between optical surfaces. The lens aperture does not exceed one square inch and meets the styling requirements for most television receivers.

The light receiver provides optical gain without severely limiting the receiver horizontal acceptance angle. Reliable operation over a horizontal angle of 160° has been achieved. The vertical acceptance angle is restricted to reduce the reception of ambient noise from overhead incandescent and fluorescent lamps. Since the variation in height position of a hand held transmitter is small, the restriction of the vertical acceptance angle does not impair reliable operation.

The receiver of the present invention will work with a number of transmitters. One such transmitter is described in copending application, Ser. No. 626,164, filed on the same date as the present application in the same of Eugene P. Mierzwinski and entitled *Remote Control Light Transmitter*, common assignee.

A cylindrical lens oriented with the cylindrical axis in the horizontal plane is modified so that the top and bottom walls converge. The top, bottom, and side walls are coated with a reflective material so that light incident upon the walls will be reflected. The overall geometry reduces the vertical acceptance angle and enhances the horizontal acceptance angle. A photodetector is bonded to the lens near the cylindrical lens focus. The reflective coating preferably formed of electrically conductive material and serves as an electrostatic shield for the photodetector when grounded to the T.V. chassis.

It is an object of this invention to provide a light receiver with a wide horizontal acceptance angle and a reduced vertical acceptance angle.

It is a further object of this invention to improve optical gain in a light activated remote control system.

A fuller understanding of this invention may be had by referring to the figures.

FIG. 1 is a perspective view of the light receiver of the present invention.

FIG. 2 is an outline of the photodetector.

FIG. 3 is a horizontal sectional view of the light receiver of the present invention taken along the line 3—3 of FIG. 1.

FIG. 4 is a vertical sectional view of the light receiver of the present invention taken along the line 4—4 of FIG. 1.

DESCRIPTION OF THE PREFERRED EMBODIMENT

Referring to FIG. 1, the receiver consists of a lens 11 for gathering light energy and a photodetector 12 to convert light energy into an electrical current. The object surface of the lens is a convex cylindrical surface 13 having a cylindrical axis 139. The cylindrical surface 13 produces a line focus and the object and image distances are related by the relationship.

$$\frac{N}{S} + \frac{N'}{S'} = N' - \frac{N}{r}$$

where S is the object distance to the lens, S' is the image distance, N is the index of refraction on the object side of the lens, N' is the index of refraction of the lens material, and r is the radius of the cylinder. Maximum vertical acceptance angle is achieved when the cylindrial surface 13 is a full semi-cylinder and the lens walls 16, 17 are parallel. The convergence angle of surfaces 16 and 17 is used to control the lens vertical acceptance angle in a manner to be explained.

The lens material was chosen to be plexiglass, having an index of refraction of 1.36 for a light wavelength of 940nm. Other suitable materials such as polystyrene plastic or glass may be used. The top and bottom surfaces 16, 17 subtending the cylindrical arc of surface 13 are plane surfaces and are coated with a reflective material 24. The parallel vertical side surfaces 14, 15 are also coated with reflective material 24.

The light detector 12 is located within the lens 11 opposite the cylindrical surface 13. The preferred location for the light sensitive portion of the photodetector 12 was determined experimentally to be in front of the cylindrical surface 13 focus. Since different object locations produce different image locations, the photodetector 12 having lead wires 19 is placed in a position where some energy from all object locations may be intercepted. Once this position is located, the rear surfaces 18 may be located. The height of the rear surface 18 must be sufficient to support the mounting of the photodetector 12. This height establishes the vertical angle of the walls 16, 17 subtending the semicylindrical surface. The photodetector is directly bonded to the lens in a drilled or cast hole located in the rear surface 18 with a clear epoxy. If the hole surfaces are polished, direct bonding with an adhesive having an index of refraction substantially the same as the lens material reduces the losses incurred when light passes from lens 11 to the photodetector 12. Referring to FIG. 2, a commercially available photodetector 12 already mounted in a metallic can 21 is shown with lead wires 19 connected. A small light gathering lens 22 may be bonded to the photosensitive surface of the photodetector 12. When bonded in the receiver of the present invention, the lens 22 and the bonding materials form a continuous optical medium with the material of the lens 11. Thus, there are no air/lens material interfaces within the receiver which would create additional path losses.

FIG. 3 illustrates the lens 11 operation by showing the path of incident energy radiating from a source horizontally off the lens axis and incident upon the lens surface 13. The parallel walls 14, 15 subtending the length of the cylindrical surface 13 are coated with a reflective material 24. Light originating horizontally off the axis of the lens and incident upon the cylindrical surface 13 is refracted towards the lens focus. Some of the rays will become incident upon surfaces 14 or 15. Without the reflective coating, rays incident to the surfaces 14 or 15 at an angle greater than the critical angle would pass through surface 14 or 15 and not be available for detection by the detector 12. The reflective coating however reflects approximately 90 percent of the incident energy that would otherwise be lost, thus improving the gain of the receiver over a wider horizontal angle. Because of the parallel orientation of the walls, energy is propagated towards the photodetector 12 located at the rear of the lens.

FIG. 4 illustrates the lens 11 operation by showing the path of incident energy radiating from a source vertically off the lens axis and incident upon the lens surface 13. In contrast to the increased light gathering properties of the parallel sidewall surfaces 14, 15 of FIG. 3 the convergent surfaces 16, 17 operate to reduce the amount of light gathered from sources that are vertically off the lens axis. Light passing through the front surface 13 from a source beyond the vertical acceptance angle and incident upon surface 17 is reflected to the opposite wall 16. This wall 16 tends to reflect incident light energy produced by sources radiating above an acceptance angle α towards the front lens surface 13 instead of towards the rear surface 18. Radiation which is reflected to the second wall 17 at an angle of 90° is reflected towards the front of the lens. The angle that the source which produces this reflection makes with the lens axis defines the acceptance angle α and the lens will tend to reject light energy radiating from sources above this angle. The vertical acceptance angle of the receiver is in this way reduced by the angle formed by the converging surfaces 16, 17. Sources radiating from locations at angles in excess of the vertical acceptance angle constitute noise from overhead lights and ceiling reflections which the receiver tends to reject. Further noise rejection from sources emanating from overhead lighting can be achieved by tilting the lens axis towards the floor. This also effectively narrows the vertical acceptance angle.

Coating the lens 11 with reflective material 24 has an additional advantage. The photodetector 12 is sensitive to radiation emanating from the horizontal oscillator of the television receiver. By forming the reflective coating from an electrically conductive material and grounding it to the television receiver chassis, an electrostatic shield is formed by the lens coating. This shield keeps radiated noise from being induced into the photodetector. If the reflective coating is not adequate to shield the photodetector, a separate layer of shielding material grounded to the chassis may be required.

It will be understood that specifics to the above receiver will vary according to the application. The following specifications which were used in one embodiment of the receiver are given by way of example only.

Cylinder 13 radius — 7.937mm
Overall Length — 26.95mm
Rear Surface 18 — 6.350mm H X 15.875mm W
Lens Width 15.875mm
Distance from cylinder axis to detector front surface — 14.65mm
Photodetector — MATSUSHITA PN110W or TEXAS INSTRUMENTS TIL81
Lens Material — Plexiglass
Reflective Coating: Aluminum Tape or Electrodeposited Aluminum.

What is claimed is:

1. A receiver for receiving light comprising a lens formed of optical material having a front light receiving surface, said front light receiving surface being cylindrical about an axis, said axis being located rearwardly of said front surface; side surfaces, said side surfaces being substantially parallel and mutually perpendicular to said axis of curvature, said side surfaces being at least partially coated with a reflective coating; a top surface; a bottom surface; and further comprising a photodetector located within said optical material.

2. The receiver of claim 1 wherein said top and bottom surfaces are planar and converge toward a line located rearwardly of said front surface.

3. The receiver of claim 2 further comprising a reflective coating covering said top surface and said bottom surface.

4. The receiver of claim 1 wherein said photodetector is located between said axis of curvature and said front surface optical focus.

5. A lens for receiving light formed of optical material having a front light receiving surface, side surfaces, a planar top surface and a planar bottom surface, said front surface being cylindrical about an axis of curvature, said side surfaces being parallel and mutually perpendicular to said axis of curvature, and said top and bottom surfaces being convergent toward a line located rearwardly of said front surface and means for mounting a photodetector within said optical material.

6. A lens for receiving light formed of optical material and having a front light receiving surface, side surfaces, a planar top surface, a planar bottom surface, and a rear surface, said front surface being cylindrical about an axis of curvature, said side surfaces subtending the length of said front surface and being parallel and mutually perpendicular to said axis of curvature, said top and bottom surfaces subtending the arc of said front surface and being convergent toward a line located rearwardly of said rear surface, and said rear surface having a cavity therein for receiving a photodetector.

7. The lens of claim 6 further comprising a reflective coating covering at least a portion of each of said side surfaces adjacent said front surface.

8. A light receiver comprising the lens of claim 6 and a photodetector located within said cavity.

9. The light receiver of claim 8 wherein said photodetector is adhered within said cavity by an adhesive material having an index of refraction substantially equal to the index of refraction of said optical material so that said adhesive material and said optical material cooperate to substantially eliminate any optical surface at their interface.

10. The lens of claim 7 wherein said reflective coating is electrically conductive.

11. The light receiver of claim 8 wherein said reflective coating is electrically conductive.

12. A receiver for receiving light comprising a lens formed of optical material having a front light receiving surface, said front light receiving surface being cylindrical about an axis, said axis being located rearwardly of said front surface; side surfaces; top and bottom surfaces; said side surfaces, top and bottom surfaces being at least partially reflective; and further comprising a photodetector located within said optical material.

* * * * *